United States Patent [19]

Ott

[11] Patent Number: 5,892,694
[45] Date of Patent: Apr. 6, 1999

[54] SAMPLE RATE CONVERSION BETWEEN ASYNCHRONOUS DIGITAL SYSTEMS

[75] Inventor: Stefan Ott, Munich, Germany

[73] Assignee: VLSI Technology, Inc., San Jose, Calif.

[21] Appl. No.: 846,655

[22] Filed: May 1, 1997

[51] Int. Cl.$^6$ ................................................. G06F 17/10
[52] U.S. Cl. .......................................................... 364/724.1
[58] Field of Search ........................................ 364/724.1

[56] References Cited

U.S. PATENT DOCUMENTS

| | | | |
|---|---|---|---|
| 4,020,332 | 4/1977 | Crochiere et al. | 364/724.1 |
| 4,472,785 | 9/1984 | Kasuga | 364/724.1 |
| 5,355,328 | 10/1994 | Arbeiter et al. | 364/724.1 |
| 5,383,144 | 1/1995 | Kato | 364/724.1 |
| 5,461,604 | 10/1995 | Hasegawa | 364/724.1 |

*Primary Examiner*—David H. Malzahn
*Attorney, Agent, or Firm*—Wagner, Murabito & Hao

[57] ABSTRACT

A method and implementing system includes transmitting a sampled and digitized source analog signal which is sampled for transmission at a rate of FT, to a receiving device and converting the received signal by a first sample rate converter circuit which is effective to multiply the sample rate FT by a first factor "N". The converted signal is then processed by a receiver sampler circuit and applied to a second sample rate converter circuit operating at a rate of a receiver frequency FR. The second sample rate converter circuit is effective to divide the processed signal by a second factor "M". The signal is then processed by a digital to analog converter and filtered to filter out the spurious components and provide a reproduction of the source analog signal.

16 Claims, 4 Drawing Sheets

5,892,694

SAMPLE RATE CONVERSION BETWEEN ASYNCHRONOUS DIGITAL SYSTEMS

TECHNICAL FIELD

The present invention relates generally to information processing systems and more particularly to an improved information processing method and device for reducing signal distortions caused by information transmission between asynchronous digital systems.

BACKGROUND ART

Transmission of digital information and data between systems has become an essential part of commonly used systems, and in most cases users are not aware that the information has been transmitted in digital format. For the most part, it is difficult if not impossible for a user to perceive any indication that the transmission is digital rather than analog. In applications where the contents of the data transmission represent information like voice, sound, moving pictures, or sensor data, there is usually a requirement on delivery time, which will hereinafter be referred to as a "real-time" requirement.

Digital communication between devices distant from each other usually precludes the availability of identical sampling frequencies except for those cases where a distant clocking hierarchy structure has been defined and a common distributed clock source can be employed. In a variety of applications, the transmitter (data source) and receiver (data sink) operate at different sampling clock frequencies where the ratio between the frequencies is a non-integer. In some cases, there is no flexibility for the receiver clock to fine-tune or adjust to a common clock, or an integer product quotient, of the clock of the transmitter. That is, even though information is being transmitted at the same nominal sampling rate, when the local clocks are not the same, there will usually be a slight difference in the actual sampling rates. As a result, sampling at the sending terminal and reconstruction at the receiving terminal will be accomplished with a slight variance in the nominal sampling rates. Frequencies may also vary over temperature, part scattering, and time. For clock ratios with a fractional part, a rate exists at which sample overruns or underruns at the receiver input will occur. Those overruns and underruns are hereinafter referred to as sample slippage. Sample slippage generates objectionable distortion, for example, in the form of an audible click noise in audio transmissions and horizontal jitter in television systems.

Also, in some systems, the error due to slippage is cumulative and segments of transmitted information are backed-up and/or delayed. Over a period of time, such segments may eventually be periodically lost especially if the system is designed to re-synchronize or to attempt to re-synchronize itself to real time or to a master clock.

Thus, there is a need for a digital transmission system effective to reduce slippage signal distortions to a tolerable level, where the computational effort can be tailored to the required degree of accuracy in signal reproduction.

DISCLOSURE OF THE INVENTION

A method and implementing system are provided in which a received digital signal representative of a sampled analog source signal is processed to have the received digital signal interpolated to a higher sample rate thereby allowing sample slippage to occur at a higher rate, and then decimate and downconvert the signal to the desired received sample rate. The present invention decreases the noise level of the signal and spreads the noise energy over a wider range of frequencies such that subsequent filtering is effective to remove a higher percentage of noise and provide a reproduction of the analog source signal with higher fidelity and less distortion.

In one embodiment, the method and system further includes a frequency dividing operation following, and in conjunction with, the sample insertion operation in order to improve synchronization between transmission and reception systems.

BRIEF DESCRIPTION OF THE DRAWINGS

A better understanding of the present invention can be obtained when the following detailed description of a preferred embodiment is considered in conjunction with the following drawings, in which.

Prior Art

BEST MODE FOR CARRYING OUT THE INVENTION

Figure 1:
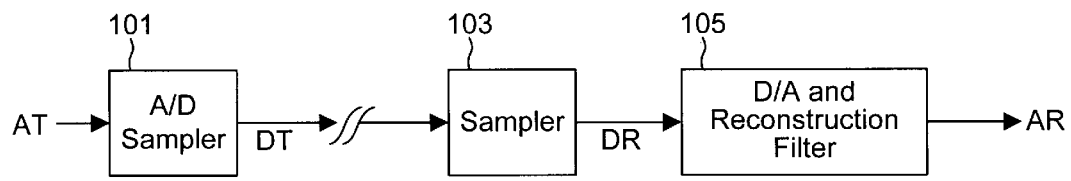
FIG. 1 is a simplified block diagram of a conventional digital transmission system.

With reference to Prior Art FIG. 1, there is shown a typical digital information transmission system including an analog to digital sampling circuit (A/D sampler) 101. A/D sampler 101 receives an analog signal for transmission AT, takes samples of the analog signal AT, and provides a digital transmission signal DT. The DT signal is transmitted, either through a wireless system or a hard-wired system, or some combination of the two, to a receiving sampler circuit (sampler) 103. Sampler 103, in turn, provides a digital received signal DR for application to a digital-to-analog and reconstruction circuit (D/A and reconstruction filter) 105. D/A and reconstruction filter 105 provides an output analog signal AR representing a reproduction or reconstruction of the analog transmitted signal AT. In the system shown, slippage may occur due to slight variations between the transmitting and receiving frequencies. Frequency slippage will result in an undesirable and audible "clicking" sound. Generally, that slippage will increase over time and adversely affect the fidelity of the transmitted information. In voice systems for example, voice signals which may be sampled at a rate of 8K samples per second, will typically be subject to a frequency slippage rate of one sample per second.

As illustrated in Prior Art FIG. 1, an analog low-pass signal AT, which has a useful bandwidth BAT, is applied to the A/D Sampler 101. The present discussion utilizes low-pass signals for illustrative purposes, but the present invention can be similarly applied to band-pass signals. The signal AT is converted into a digital representation DT using a sampler, e.g. A/D sampler 101 operating at a discrete transmission frequency of FT. A digital receiver circuit sampler circuit, sampler 103, has a receiver operating frequency of FR which is nominally equivalent to the transmission frequency FT but may be slightly different in real time value. If FR is not exactly equal to FT, then there is a real time slippage between frequencies and a slippage will occur at a rate of the absolute value of the difference between the actual frequency values FR and FT. In addition to the loss of information, the slippage introduces phase noise. The spectrum of the phase noise consists of an infinite number of spurious components that occur spaced by the slippage frequency of FS. The present disclosure illustrates one method of reducing the additional noise energy, caused by sample slippage, within the useful bandwidth BAT at the receiver output.

Figure 2:
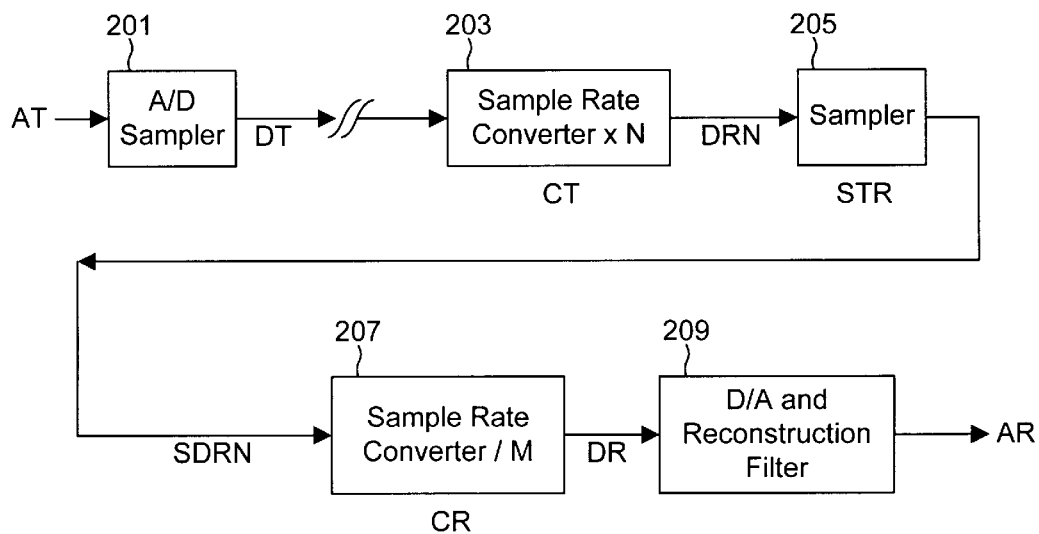
FIG. 2 is a simplified block diagram of an exemplary digital transmission system including an implementation of the information processing method disclosed herein.

In FIG. 2, an analog signal to be transmitted AT is applied to an analog-to-digital sampler (A/D sampler) 201 which, in turn, provides an output digital signal for transmission DT. The digital signal DT is transmitted to a Sample Rate Converter xN circuit 203 at a receiving station. Sample rate converter xN circuit 203 provides a digital received signal DRN which is applied to a sampler circuit (sampler) 205. Sampler 205 outputs a sampled digital received signal, SDRN. The SDRN signal is applied to a Sample Rate Converter divided by M circuit 207 which outputs a digital received signal DR. The DR signal is applied to a digital-to-analog (D/A) and Reconstruction Filter circuit 209 which provides an output analog received signal AR.

In FIG. 2, there is represented a chain of sample rate converters and samplers. First sample rate converter x N 203 increases the sampling rate or frequency FT of the digitally received signal DT (assuming a lossless transmission) by a factor "N" to a rate FTN (i.e. FT*N), thereby producing signal DRN. Sampler circuit 205 operating at a rate FRM (FR*M) bridges the gap between rates FTN and FRM to obtain signal SDRN. Signal SDRN is applied to a second sampler rate converter (Sample rate converter/M) 207 which is effective to decrease the rate FRM of signal SDRN by divisor "M" to obtain a signal DR at a rate FR. Signal DR is then applied to (D/A and Reconstruction Filter)circuit 209 which is effective to convert DR into an analog signal and filter the analog signal to bandwidth BAT thereby outputting the desired signal AR which is a virtual copy of the transmitted source signal AT.

Assuming that FR does not equal FT, and, most likely, that FRM does not equal FTN, sample slippage will now occur at a rate of FSN which is equal to the absolute value of the expression (FRM minus FTN). The introduced phase noise spectrum now consists of an infinite number of spurious components occurring every FSN Hz. As a result, fewer of the components will pass the mandatory filtering to bandwidth BAT in converter 207, and consequently noise energy in signal DR is reduced. Phase noise due to sample slippage is reduced by a factor of "M" since a phase jump that occurs with a sample slippage at a sample rate FRM represents a smaller phase difference (Factor "M") for the desired signal DR than it would be at rate FR. Signal fidelity between signals AT and AR can be tailored to any requirement by selecting factors "N" and "M" that are large enough to reduce noise impairments to a tolerable residual level. As "N" and "M" increase, the system's quality will approach a noiseless analog transmission.

Figure 3:
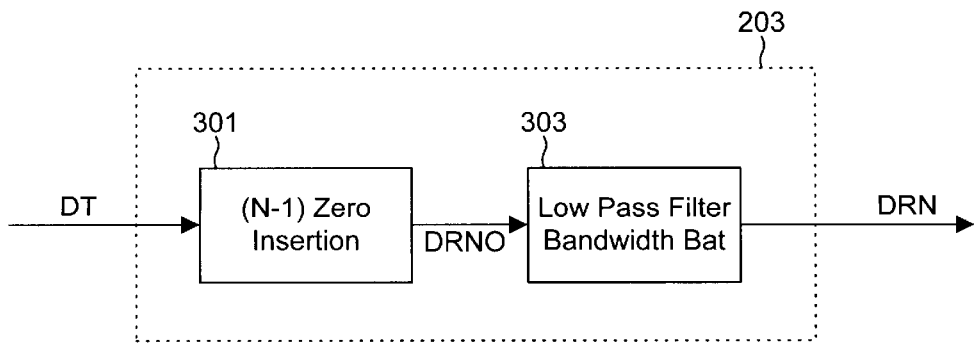
FIG. 3 is a schematic block diagram of the transmission sample rate converter circuit shown in FIG. 2.

In FIG. 3, the Sample Rate Converter xN circuit 203 is shown in more detail to include an (N-1) Zero Insertion circuit 301 which is serially connected to a Low Pass Filter Bandwidth BAT circuit 303. The effect of the N Sample Rate Converter circuit 203 is shown in detail with reference to the illustrations of FIG. 4.

Figure 4:
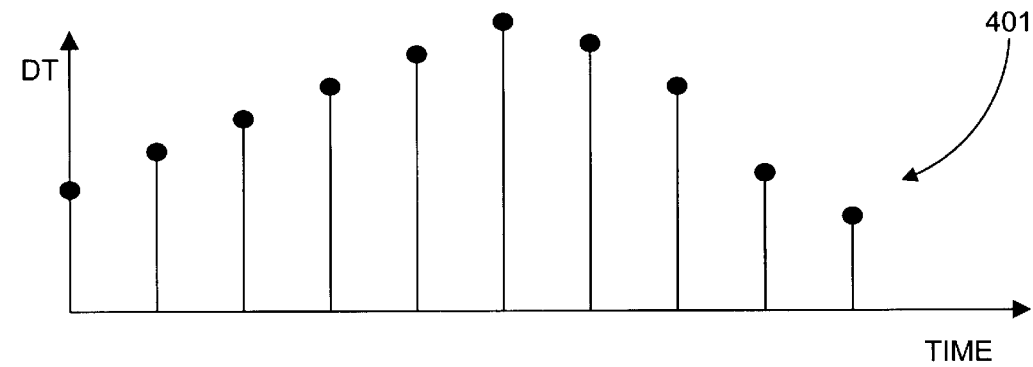
FIG. 4 is an illustration showing the effect of the Sample Rate Converter circuit upon an exemplary section of a transmitted signal.
Figure 4:
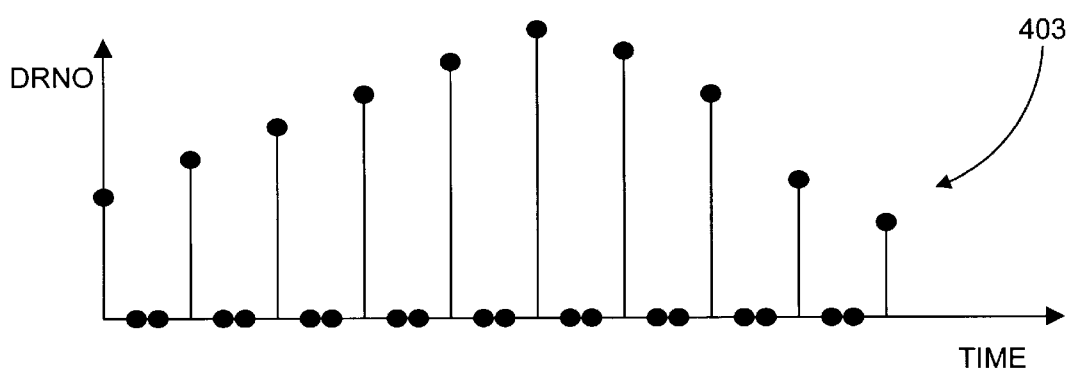
Figure 4:
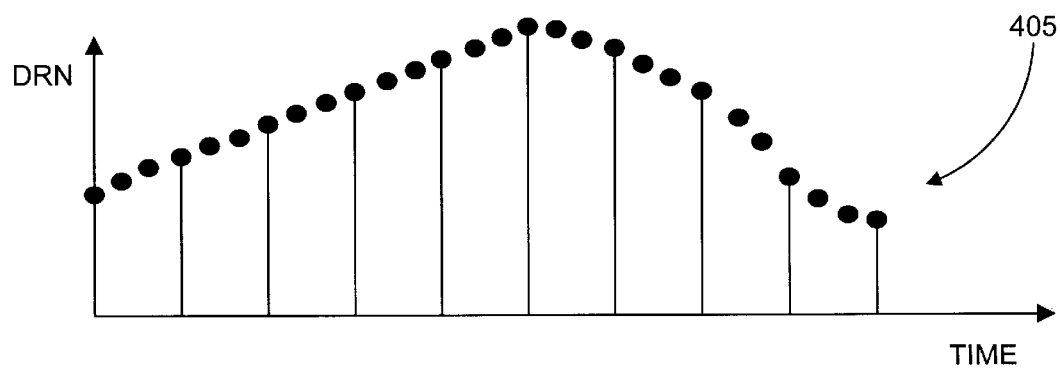

As shown in FIG. 4, the signal DT, which is comprised of ten discrete samples 401 in the present example, is applied to the N Sample Rate Converter 203. The sample data input signal DT is interpolated at an interpolation ratio "N". The interpolation ratio N is selected as the numeral "3" in the present example, although higher selected numerals for N are more effective as hereinafter explained. Signal DT is interpolated by inserting (N-1), i.e. "2" in the present example, zero-valued samples 403 between each of the ten samples of DT as illustrated. The frequency domain characteristics of the input signal are unaltered by this operation except that the zero-padded sequence is considered to be sampled at a frequency which is the product of the original sampling frequency multiplied by the interpolation ratio "N".

The zero-padded values are fed into low pass filter bandwidth BAT circuit 303 which is comprised, for example, of a digital FIR low-pass filter to smooth or integrate the sequence, and limit the bandwidth of the filter bandwidth to 20 KHz for example. At that point, the interpolated signal has been quantized to a much finer time scale than the original sequence. The interpolated sequence is then passed to a zero-order hold functional block, which may be implemented by a register, and then synchronously resampled at the output sample frequency by sampler circuit 205. The resampling can be considered a decimation operation since only a very few samples out of the great many interpolated samples are retained. The output values represent the "nearest" values produced by the interpolation operation. There is always some variance in the output sample amplitude due to the fact that the output sampling switch does not close at a time that exactly corresponds to a point on the fine time scale of the interpolated sequence. However, that variance can be made arbitrarily small by using a very large interpolation ratio N. The resultant sampled values are depicted by samples 405 of FIG. 4.

Figure 5:
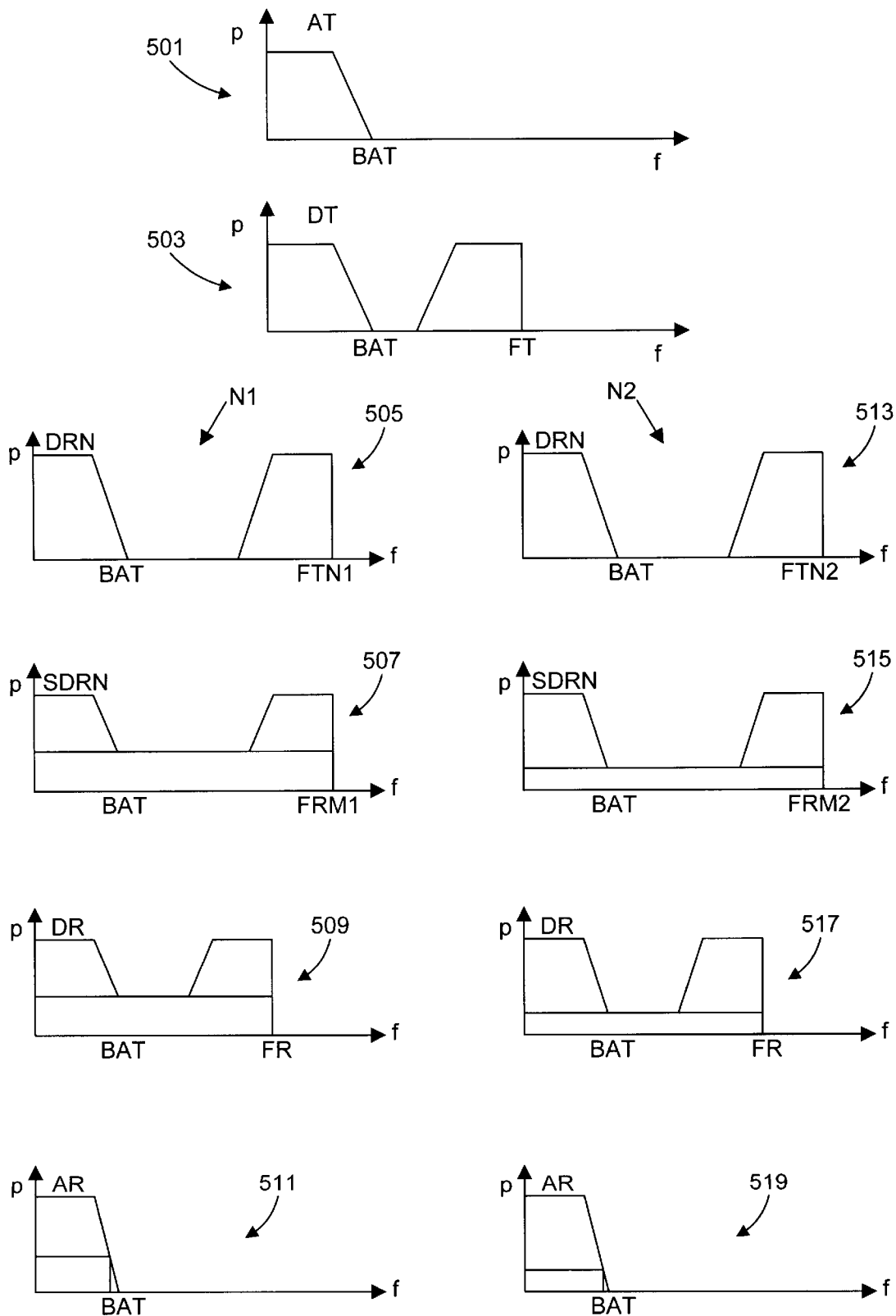
FIG. 5 is a schematic illustration of the frequency spectrum of various signals within the exemplary digital information transmission system shown in FIG. 2.

FIG. 5 shows the frequency spectra charts for various signal stages within the conversion circuits, including frequency spectra for signals AT, DT, DRN, SDRN, DR and AR, for two different values of the variable "N". In the example of FIG. 5, N2 is larger than N1. As illustrated, the source signal AT includes frequency components 501 within the band BAT. After being sampled, the frequency range for the signal DT 503 includes an upper band or lobe at the frequency FT. At that point, after the transmitted signal DT is received and converted by Sample Rate Converter xN circuit 203 to provide the DRN signal, the frequency spectrum has widened to FTN1 as shown at 505. If the interpolation ratio N had been chosen to be a higher value, i.e. N2 rather than N1, the frequency spectrum for the DRN signal would be of a higher bandwidth FTN2 with the sampling lobes spaced farther apart as shown at 513. In effect, the higher the value of the interpolation ratio N, the greater will be the bandwidth over which the sampling noise will be distributed and the lower will be the value of the noise at any given frequency within the band. As the SRDN signal passes through Sample Rate converter/M207 which provides output signal DR, the frequency spectrum changes as shown at 507 and 509. For higher values of N, i.e. N2, the noise level is substantially reduced as indicated at 515 and 517. The effect of low pass filter bandwidth BAT 303 is to eliminate the upper frequency band of the DR signal and provide output signal AR 511, 519.

Figure 6:
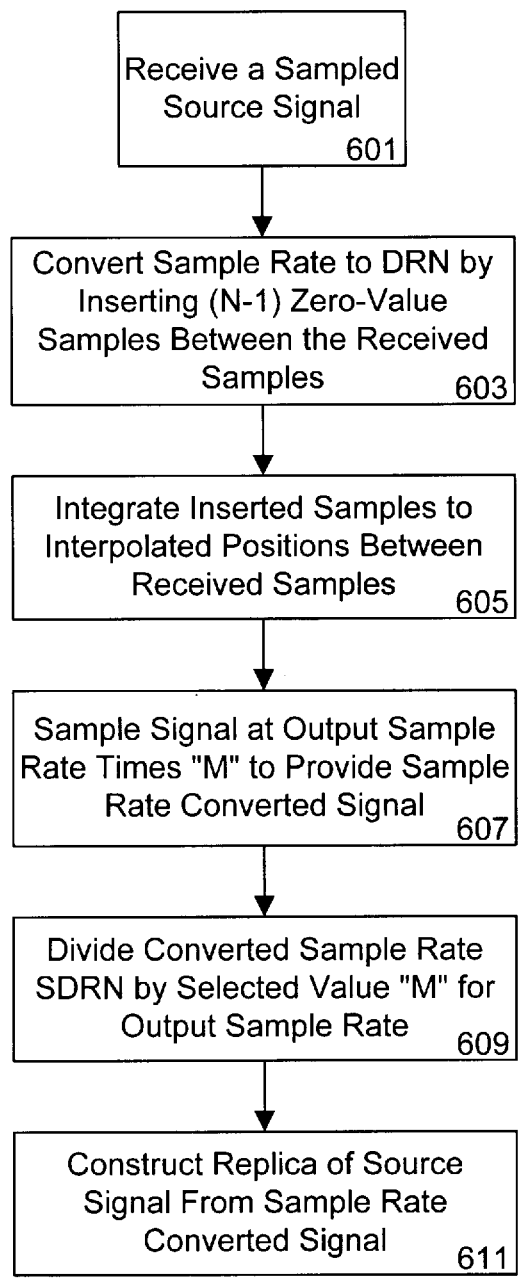
FIG. 6 is a flow chart illustrating a typical sequence of operation for the exemplary digital information transmission system disclosed herein.

With reference now to FIG. 6, a flow chart of steps performed by the present invention is shown. At step 601, the present invention receives a sampled source signal from a transmitter location. It is noted that the transmitter location may be operated from a first clock source and the receiving station may be operated from a second separate clock source. Even though both stations are operating at the same nominal frequency or sample rate, for several reasons as hereinbefore explained, the transmitting and receiving frequencies will likely be slightly different. This can result in an accumulating frequency slippage error which may be minimized by utilizing the sample rate conversion technique described herein. The flow chart of FIG. 6 begins with the receiving of a sampled source analog signal, it being understood that the initial sampling and transmission operations, which have been previously explained, would be included in a total system implementation of the present invention.

In step 603, after receiving a sampled source analog signal, the present invention converts the sample rate of the received signal is converted to a converted rate DRN by inserting (N-1) zero-value samples in positions between the received samples thereby providing a signal with a new N-converted sample rate which is "N" times the received sample rate.

As shown in step 605, the present invention then assigns the zero-valued samples interpolated values and integrates or inserts the zero-valued samples in-between the received samples at the interpolated positions.

At step 607, the present invention samples the processed signal at the output sample rate times "M" to provide a sample rate converted signal. At step 609, in one embodiment, the sampling rate is divided by a factor "M" in order to more closely match a receiver system sampling clock where the transmitter sampling rate and the receiver sampling rate are not even multiples, one of the other. In systems where the transmitting and receiving rates are the same, the selection of the value of "M" will be the same value as the value chosen for the factor "N". The converted sample rate SRDN is then divided by a selected value "M" to determine an output sample rate. As explained above, these steps are effective to reduce the level of the sampling noise and spread the sampling noise over a wider spectrum such that more of the noise can now be effectively filtered out.

As shown at step 611, the present invention uses the sample rate converted signal to construct a replica of the originally transmitted analog source signal.

It is noted that both factors "N" and "M" are selected to be whole number integers. The disclosed method and system is most effective for higher values of the "N" factor although circuit speed and technology will provide a practical "upper limit" for the "N" and "M" factors. For example, consider a system where one source is operating at 44 KHz and a receiving system is operating at 48 KHz. The ratio of the "N" factor and the "M" factor is selected such that the product of "N" multiplied by the transmitting frequency or sample rate is as close as possible to the product of "M" multiplied by the receiving frequency or sample rate. In systems where the nominal rate for transmission and reception are the same rate, then "N" will equal "M" but the selection of the highest obtainable value of "N" and consequently "M" will be effective to reduce the signal distortion to a tolerable and manageable level.

The method and apparatus of the present invention has been described in connection with a preferred embodiment as disclosed herein. Although an embodiment of the present invention has been shown and described in detail herein, along with certain variants thereof, many other varied embodiments that incorporate the teachings of the invention may be easily constructed by those skilled in the art, and even included or integrated into a CPU or other integrated circuit or chip. Accordingly, the present invention is not intended to be limited to the specific form set forth herein, but on the contrary, it is intended to cover such alternatives, modifications, and equivalents, as can be reasonably included within the spirit and scope of the invention.

I claim:

1. A signal processing apparatus for achieving synchronization between asynchronous systems by processing a signal representative of a series of source samples taken from a source signal at a first sample rate, said signal processing apparatus comprising:

a sample inserting circuit for inserting additional samples into the series of source samples, such that the first sample rate is effectively multiplied by a first factor "N" to provide a sample rate converted signal having a second sample rate of "N" multiplied by the first sample rate;

a dividing circuit for dividing the second sample rate by factor "M" to provide a processed series of samples at a sample rate equal to the second sample rate divided by "M"; and a filtering circuit coupled to the dividing circuit to receive the sample rate converted signal, the filtering circuit being operable for filtering the sample rate converted signal to remove higher frequency components of the sample rate converted signal.

2. The apparatus as set forth in claim 1 wherein the sample inserting circuit further includes:

a sample inserting device for providing additional samples as (N-1) zero-based samples between each pair of samples in the series of source samples.

3. The apparatus as set forth in claim 2 wherein the sample inserting circuit further includes:

a sample inserting device for providing additional samples as (N-1) zero-based samples between each pair of samples into series of source samples.

4. The apparatus as set forth in claim 1 and further including:

a reconstructing circuit for reconstructing an analog source signal from the processed series of samples.

5. The apparatus as set forth in claim 1 and further including:

a dividing circuit for dividing the second sample rate by a factor "M" to provide a processed series of samples at a sample rate equal to the second sample rate divided by "M".

6. The apparatus as set forth in claim 5 wherein "M" is a whole number integer greater than one.

7. The apparatus as set forth in claim 1 and further including:

a reconstructing circuit for reconstructing the source signal from the sample rate converted signal.

8. The apparatus as set forth in claim 1 wherein "N" is a whole number integer greater than one.

9. A signal processing system for achieving synchronization between asynchronous systems by processing a source signal, said signal processing system comprising:

a source sampling circuit for providing a series of source samples representative of the source signal sampled at a first sample rate;

a transmitting device coupled to said source sampling circuit, said transmitting device being effective for transmitting said series of source samples to a receiver;

a receiver device for receiving said series of source samples;

a sample inserting circuit for inserting additional samples into the series of source samples, such that the first sample rate is effectively multiplied by a first factor "N" to provide a sample rate of "N" multiplied by the first sample rate; and a dividing circuit for dividing the second sample rate by factor "M" to provide a processed series of samples at a sample rate equal to the second sample rate divided by "M"; and a filtering circuit coupled to receive the sample rate converted signal for filtering the sample rate converted signal to remove higher frequency components of the sample rate converted signal.

10. The apparatus as set forth in claim 9 wherein the sample inserting circuit further includes:

a sample inserting device for providing additional samples as (N-1) zero-based samples between each pair of samples in the series of source samples.

11. The apparatus as set forth in claim 10 wherein the inserting circuit further includes:

an interpolating circuit for interpolating between the series of source samples to assign a value to the zero-based samples such that the additional samples are effective to provide a smoothed transition between each pair of samples in the series of source samples.

12. The apparatus as set forth in claim 9 and further including:

a reconstructing circuit for reconstructing the source signal from the processed series of samples.

13. The apparatus as set forth in claim 9 and further including:

a dividing circuit for dividing the second sample rate by a factor "M" to provide a processed series of samples at a sample rate equal to the second sample rate divided by "M".

14. The apparatus as set forth in claim 13 wherein "M" is a whole number integer greater than one.

15. The apparatus as set forth in claim 9 and further including:

a reconstructing circuit for reconstructing the source signal from the sample rate converted signal.

16. The apparatus as set forth in claim 9 wherein "N" is a whole number integer greater than one.

* * * * *